US011601278B2

(12) United States Patent
Gordon et al.

(10) Patent No.: US 11,601,278 B2
(45) Date of Patent: Mar. 7, 2023

(54) AUTHENTICATION OF INTELLIGENT ELECTRONIC DEVICES (IEDS) USING SECURE ASSOCIATION KEYS (SAKS)

(71) Applicant: Schweitzer Engineering Laboratories, Inc., Pullman, WA (US)

(72) Inventors: Colin Gordon, Katy, TX (US); Timothy J. Watkins, Lewiston, ID (US); Paul Stoaks, Moscow, ID (US); Duane C. Skelton, Bellingham, WA (US); Dennis Gammel, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 80 days.

(21) Appl. No.: 17/212,030

(22) Filed: Mar. 25, 2021

(65) Prior Publication Data
US 2022/0311615 A1 Sep. 29, 2022

(51) Int. Cl.
*H04L 9/32* (2006.01)
*H04L 9/08* (2006.01)
*H04L 9/40* (2022.01)

(52) U.S. Cl.
CPC .......... *H04L 9/3226* (2013.01); *H04L 9/0838* (2013.01); *H04L 9/0869* (2013.01); *H04L 63/0428* (2013.01)

(58) Field of Classification Search
CPC ... H04L 9/3226; H04L 9/0838; H04L 9/0869; H04L 63/0428
See application file for complete search history.

(56) References Cited

U.S. PATENT DOCUMENTS

| | | | |
|---|---|---|---|
| 7,729,276 B2 | 6/2010 | Akyol | |
| 2014/0304500 A1* | 10/2014 | Sun | H04L 63/061 713/153 |
| 2015/0148965 A1* | 5/2015 | Lemire | F24F 11/62 700/276 |
| 2016/0234186 A1* | 8/2016 | Leblond | H04L 67/34 |
| 2018/0145981 A1* | 5/2018 | Du | H04L 67/12 |
| 2019/0116183 A1 | 4/2019 | Hussain | |
| 2019/0173860 A1 | 6/2019 | Sankaran | |
| 2019/0342101 A1 | 11/2019 | Hayes | |
| 2020/0106719 A1 | 4/2020 | Acharya | |
| 2021/0218717 A1* | 7/2021 | Hill | H04L 9/0822 |
| 2021/0218737 A1* | 7/2021 | Bhagvath | H04W 12/0433 |

* cited by examiner

*Primary Examiner* — Henry Tsang
(74) *Attorney, Agent, or Firm* — Fletcher Yoder, P.C.; Richard M. Edge

(57) ABSTRACT

An intelligent electronic device (IED) includes memory and a processor operatively coupled to the memory. The processor is configured to establish, over a communication network of a power system, a communication link according to a media access control security (MACsec) Key Agreement (MKA). The TED receives a plurality of access control secure association keys (SAKs) via the communication link. The TED receives one or more checked-out SAKs indicating a request to access the TED The TED allows access based on the one or more checked-out access control SAKs matching at least one of the plurality of access control SAKs.

19 Claims, 8 Drawing Sheets

AUTHENTICATION OF INTELLIGENT ELECTRONIC DEVICES (IEDS) USING SECURE ASSOCIATION KEYS (SAKS)

TECHNICAL FIELD

The present disclosure relates generally to Media Access Control Security (MACsec), and more particularly, to using secure association keys (SAKs) of MACsec for access control in power systems.

BRIEF DESCRIPTION OF THE DRAWINGS

Non-limiting and non-exhaustive embodiments of the disclosure are described herein, including various embodiments of the disclosure with reference to the figures listed below.

DETAILED DESCRIPTION OF SPECIFIC EMBODIMENTS

Figure 1:
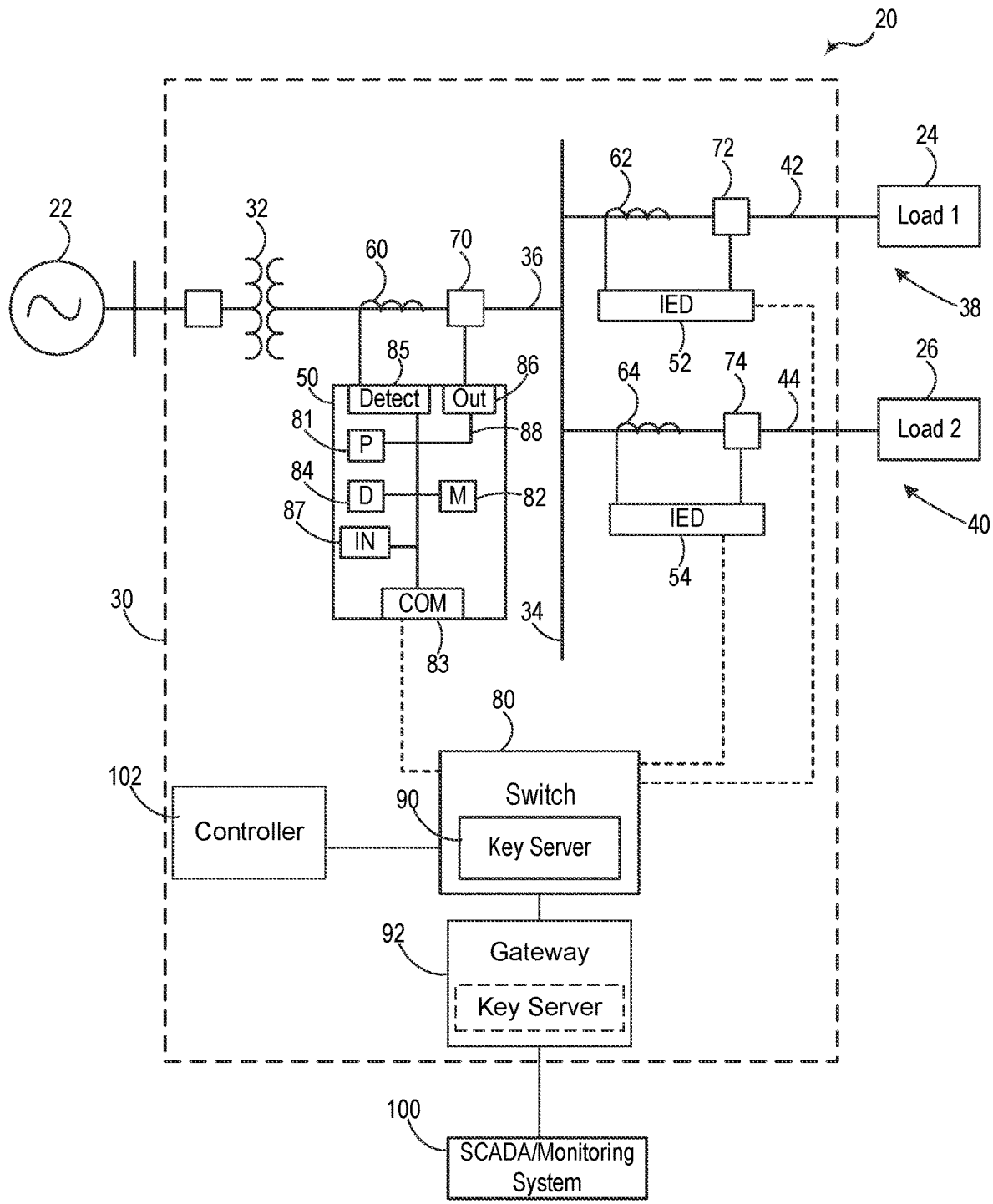
FIG. 1 is a one-line diagram of an electric power delivery system having intelligent electronic devices (IEDs) that communicate over a communication network, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Electric power delivery systems include equipment, such as generators, power lines, and transformers, to provide electrical energy from sources to loads. Various intelligent electronic devices (IEDs) may be used in monitoring, control, and protection of the power delivery system. For example, IEDs may obtain voltage measurements and/or current measurements and trip circuit breakers to disconnect electrical equipment to protect the electric power delivery system from exceeding designed operating conditions due to faults.

Operators may be given passcodes to gain access to an IED to allow the operator to perform various services. For example, the operator may inspect logging/monitoring information to ensure proper operation. Further, the operator may be instructed to disconnect a portion of the power system for service personnel to perform maintenance on the power system. However, it may be difficult to sufficiently limit access to the IED with a passcode given to an operator. For example, the passcode may be given to individuals who should not be given access. Accordingly, there is a need in the field to control access to IEDs to ensure that operators accessing the IEDs are authorized to do so.

IEDs may communicate with each other and other electronic devices to facilitate the monitoring, control, and protection of the power delivery system. For instance, IEDs may be connected to a wired Ethernet network, via a network switch, that receives data from a sending IED and forwards the received data to a destination IED. The IEDs may communicate power system data, such as voltage measurements, current measurements, circuit breaker statuses, and circuit breaker commands, among others, to allow the IEDs to better control and protect the power system.

To communicate, IEDs may send the power system data encapsulated into frames of a data link layer of a network. The data link layer may refer to the layer two of the open systems interconnection (OSI) architecture model. To improve security, IEDs may communicate the power system data according to the 802.1AE Institute of Electrical and Electronics Engineers (IEEE) Media Access Security (MACsec) frame format on the data link layer.

As explained below, MACsec may be used to facilitate access control of an IED using properties of the MACsec Key Agreement (MKA) process. For example, a key server may use the MKA process to generate secure association keys (SAKs) using a connectivity association key (CAK) of a communication link between the key server and the IED The SAKs may be used to secure a communication session between the key server and the IED in the form of MACsec secured frames. The MACsec frame may provide an indication of which SAK the MACsec frame is associated with and the IED may decrypt the MACsec frame using the associated SAK, thereby allowing the key server and the IED to communicate power system data, device management data, or any other suitable data.

Alternatively and/or additionally, the key server may use the CAK to mathematically derive a set of access control SAKs and to distribute the set of access control SAKs via the communication link. Each of the access control SAKs may be associated with metadata, such as a time period or other access control restrictions. The key server may communicate each of the associated access control restrictions for each access control SAK. Further, operators may check out access control SAKs from a secure, centralized key manager for the times at which the operator will access the IED, thereby limiting access to the IED to the desired times. By controlling access to the IED, the power system may be better secured.

FIG. 1 is a one-line diagram of a power system 20 that includes a power source 22, such as a generator, that generates and provides power to loads 24 and 26, in accordance with an embodiment. The power system 20 may include equipment, such as electrical generators, transformers, power lines (e.g., transmission and distribution lines), circuit breakers, buses, loads, and the like. A variety of other types of equipment may be included in the power system 20, such as voltage regulators and capacitor banks, among others.

As illustrated, the power source 22 may provide power, via a substation 30, to power the loads 24 and 26. The substation 30 includes a transformer 32 that steps up or steps down the voltage to be provided to a bus 34 via power line 36. Various feeders 38 and 40 may be electrically connected to the bus 34 to provide power to the loads 24 and 26 via power lines 42 and 44. Although illustrated in single-line form for purposes of simplicity, power system 20 may be a multi-phase system, such as a three-phase electric power delivery system.

The power system 20 may be monitored by one or more IEDs 50, 52, and 54, although additional IEDs may also be utilized. As used herein, an IED (such as IEDs 50, 52, and 54) may refer to any microprocessor-based device that monitors, controls, automates, and/or protects monitored equipment within the power system 20. Such devices may include, for example, remote terminal units, differential relays, transformer relays, distance relays, directional relays, feeder relays, overcurrent relays, voltage regulator controls, voltage relays, breaker failure relays, generator relays, motor relays, automation controllers, bay controllers, meters, recloser controls, communications processors, computing platforms, programmable logic controllers (PLCs), programmable automation controllers, input and output modules, and the like. The term IED may be used to describe an individual IED or a system comprising multiple IEDs. The IEDs 50, 52, and 54 may obtain electric power system data using current transformers (CTs) 60, 62, and 64, and potential transformers (PTs), and the like. The IEDs 50, 52, and 54 may detect events, such as fault events, on the power lines 36, 42, and 44 using current and voltage signals from the CTs 60, 62, and 64 and/or the PTs. The IEDs 50, 52, and 54 may be communicatively coupled to circuit breakers (CBs) 70, 72, and 74 to send control signals to the CBs 70, 72, and 74 to open (i.e., trip) or close the CBs 70, 72, and 74 based on the power system data.

The IED 50 may further include one or more processors 81, a computer-readable medium (e.g., memory 82), a communication interface 83, a display terminal 84, detection circuitry 85, output circuitry 86, and input structures 87 communicatively coupled to each other via one or more communication buses 88. The processor 81 may be embodied as a microprocessor, a general-purpose integrated circuit, an application specific integrated circuit (ASIC), a field programmable gate array (FPGA), and/or other programmable logic devices. It should be noted that the processor 81 and other related items in FIG. 1 (e.g., the memory 82) may be generally referred to herein as "processing circuitry." Furthermore, the processing circuitry may be a single contained processing module or may be incorporated wholly or partially within any of the other elements within the IED 50. It should be noted that FIG. 1 is merely one example of a particular implementation and is intended to illustrate the types of components that may be present in the IED 50.

In the IED 50 of FIG. 1, the processor 81 may be operably coupled with the memory 82 to perform various algorithms. Such programs or instructions executed by the processor 81 may be stored in any suitable article of manufacture that includes one or more tangible, computer-readable media at least collectively storing the instructions or routines, such as the random-access memory (RAM) and the read-only memory (ROM).

In the illustrated embodiment, the IED 50 includes detection circuitry 85 that detects various electrical conditions of the power line 36 based on the input signals. The detection circuitry 85 may include a current conversion circuit (e.g., a transformer) that transform the input signals to levels that may be sampled by the IED 50. The detection circuitry 85 may include analog-to-digital converter(s) that sample the current and voltage signals and produce digital signals representative of measured current and measured voltage on the power line which may be transmitted to the processor 81. The IED 50 may compare the current measurements to thresholds to detect faults and to disconnect the bus 34 from the power source 22. For example, if current on one or more phases exceeds a preset threshold and/or current-over-time exceeds a preset threshold, the processor 81 may detect a fault event and send a signal, via the output circuitry 86, to open the CB 70.

In some embodiments, the IED 50 may include a communication interface 83, such as an ethernet port, to communicate with other IEDs Further, the IED 40 may include a display terminal 86 and input structures (e.g., Universal-Serial-Bus (USB) ports, buttons, touchscreens, etc.) to allow operators to review events on the power line, change settings, etc.

Each of the IEDs 52 and 54 may have similar components (e.g., processor 81, memory 82, communication interface 83, display 84, detection circuitry 85, and output circuitry 86) to those described with respect to IED 50 to allow the IEDs 52 and 54 to obtain power system measurements, control the CBs 72 and 74, and to communicate. In some embodiments, the IEDs 50, 52, and 54 may communicate power system data via a communication network.

In the illustrated embodiment, the IEDs 50, 52, and 54 may be connected to a switch 80 to form a wired network. The switch 80 may receive frames of power system data from a sending IED and forward the power system data to a receiving IED For example, IED 50 may send and/or receive power system data to or from IEDs 52, and 54, such as voltage measurements, current measurements, and circuit breaker status, among others. If IED 52 were to detect a fault, IED 52 may communicate the fault event to IED 50 and the status of CB 72 via the wired network. If the CB 72 opens, the IED 50 may keep CB 70 closed to allow power to continue to be delivered to load 26. If IED 52 detects a fault and CB 72 remains closed, IED 50 may respond by opening CB 70, thereby isolating the fault. The IED 50 may respond to fault events faster due to the communication network, thus improving the reliability of the power system 20.

The switch 80 may include switching hardware and forwarding circuitry, which may include one or more processors, memory, and communication ports that allow the switch 80 to receive and forward power system data to a receiving device. The switch 80 may be embodied as a managed switch or an unmanaged switch.

The switch 80 may operate as a key server 90 that manages MACsec frame communication on the switch 80 via MACsec keys. In other embodiments, the key server 90 may be embodied as a gateway 92, a remote terminal unit (RTU), or the like. For example, a gateway 92 may be an electronic device that operates as an access control that authorizes access or prevents unauthorized access onto the communication network from remote devices, such as a supervisory control and data acquisition (SCADA) system 100. The key server 90 may operate using hardware of the switch 80 or the gateway 92 or may include separate hardware to communicate MACsec keys. In certain embodiments, a controller 102, such as an SDN controller or automation controller, may manage the communication network, based on inputs from a user, by sending control instructions to the switch 80. In some embodiments, the key server 90 may be a part of an intrusion detection system (IDS) that prevents intruders on the network by inspecting the messages.

Figure 2:
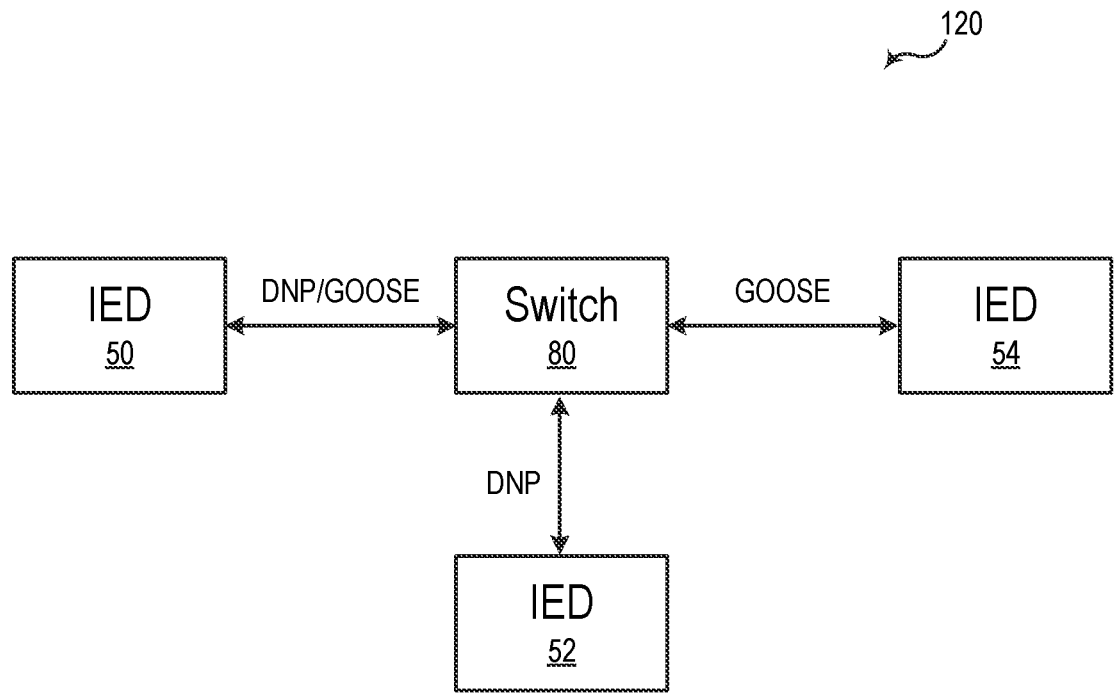
FIG. 2 is a network diagram of the communication network of FIG. 1, in accordance with an embodiment.

FIG. 2 is a block diagram of the communication network 120 of communication through the switch 80. Communication frames of different application protocols may be sent on the communication network 120, which may depend on the device and the configuration. For example, the IED 50 may communicate frames of a GOOSE application protocol with IED 52 and communicate frames of a DNP protocol with IED 54. Any suitable combination of application protocols may be used depending on the implementation of the power system 20. MACsec frames may be used to communicate power system data between each of the IEDs 50, 52, and 54 on the communication network 120.

Figure 3:
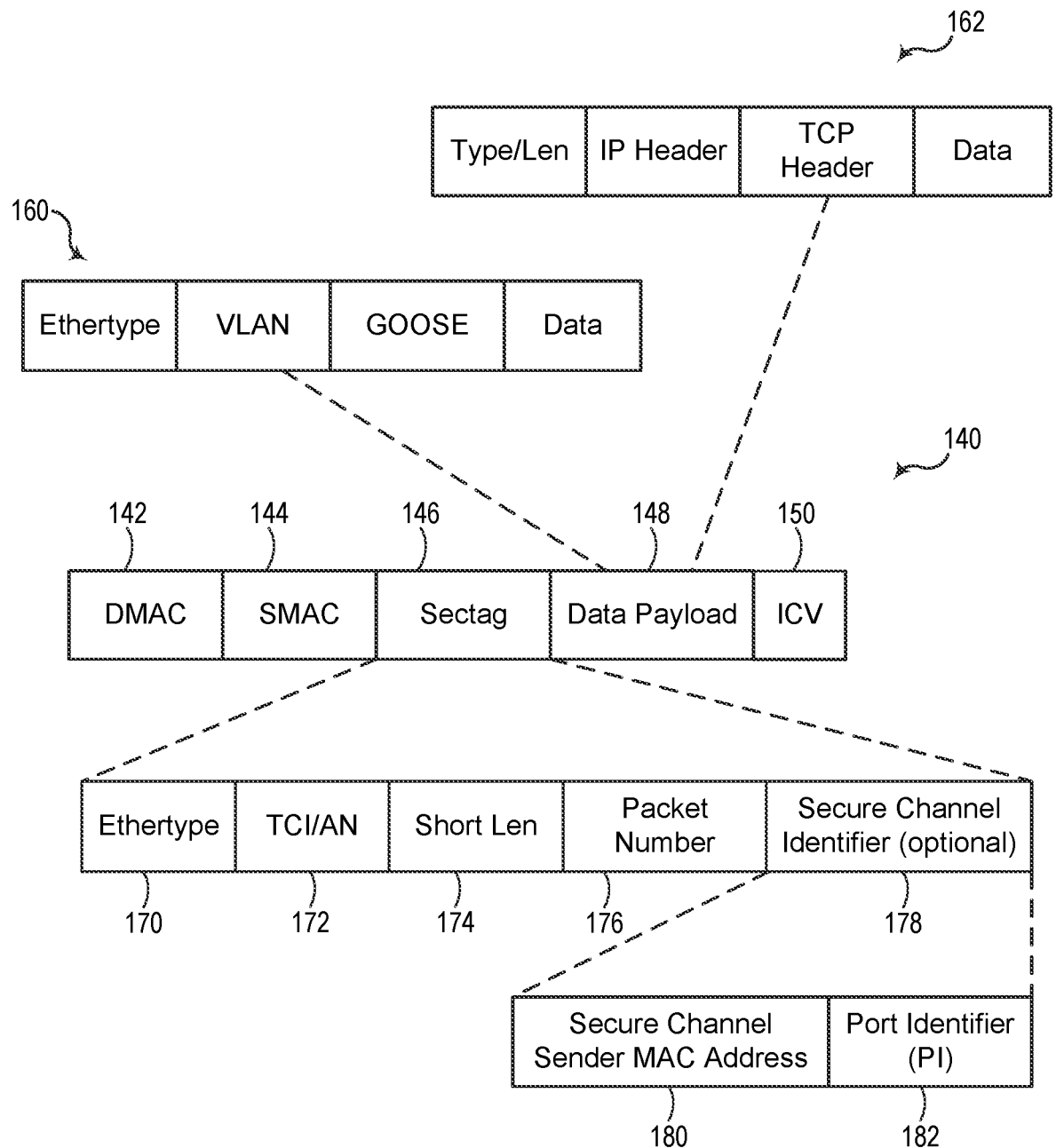
FIG. 3 is a layout of a Media Access Control Security (MACsec) frame that may be communicated on the communication network of FIG. 1, in accordance with an embodiment.

FIG. 3 is a field layout of an embodiment of a MACsec frame 140 that may be used in the communication network 120 of the power system 20. The MACsec frame 140 may include a destination MAC address 142, a source MAC address 144, a security tag (Sectag) 146, a payload 148, and an integrity check value (ICV) 150. The MAC address may be a unique number of a network interface controller (NIC) of the device. The MAC address may be stored in firmware or ROM by the manufacturer of the device. Some or all of the payload 148 may be optionally encrypted depending on the application protocol of the MACsec frame. Additionally, MACsec frames may encapsulate different message formats for different application protocols. As illustrated, MACsec frames communicating GOOSE messages 160 may include a first set of header fields and MACsec frames communicating DNP messages 162 may include a second set of header fields, different from the first set of header fields.

The Sectag 146 may include an Ethertype 170, a TCI/AN 172, a short len 174, and a packet number 176, which may be used to identify the decryption key and detect transmission of repeated frames. Further, in MACsec frames 140, the Sectag 146 may include a secure channel identifier 178, which is an optional field. The secure channel identifier 178 may include a secure channel sender MAC address 180 and a port identifier (PI) 182. The ICV 150 may ensure the integrity of the MACsec frame 140 by allowing the recipient to detect errors in the transmission process.

Figure 4:
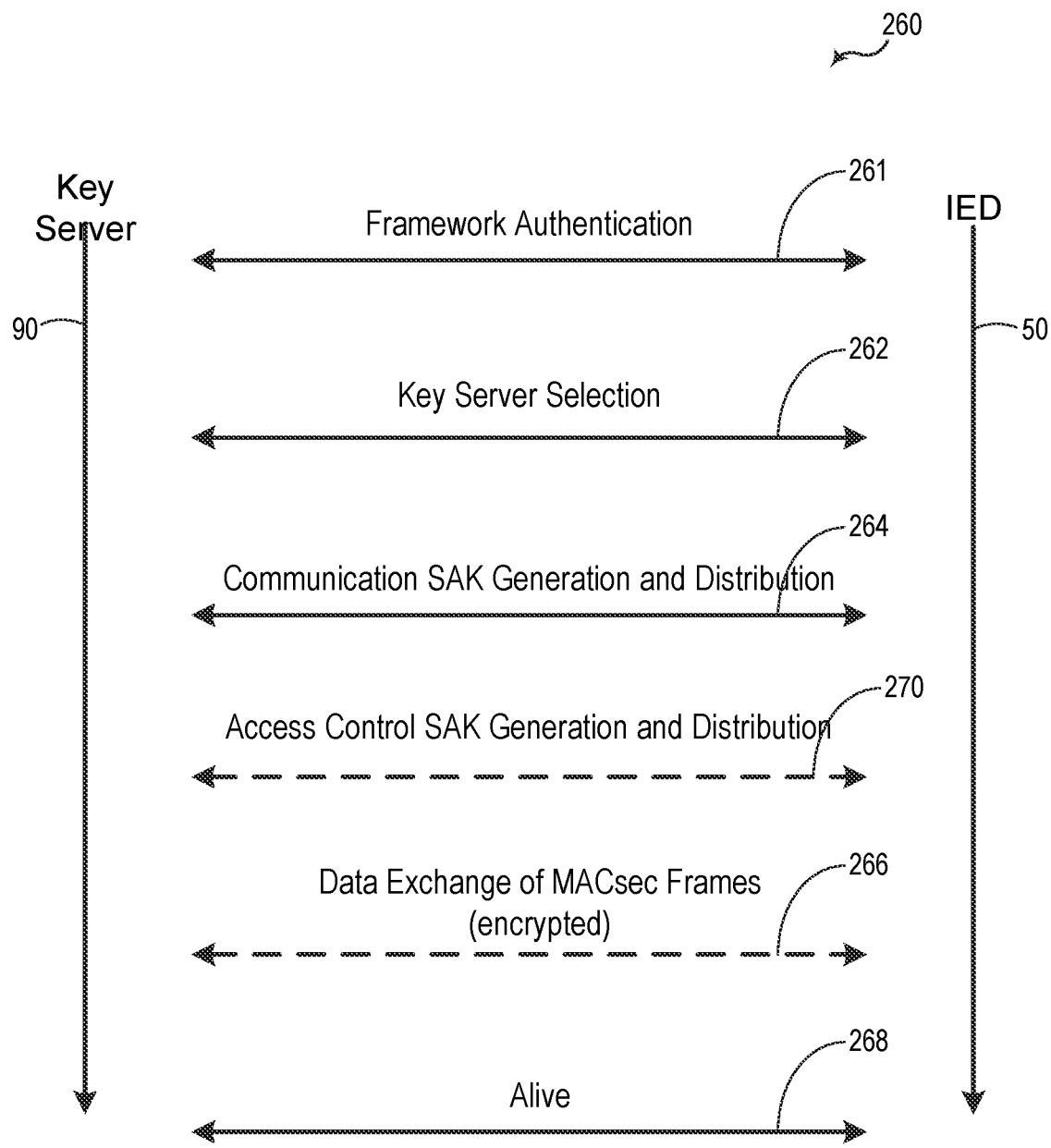
FIG. 4 is a timing diagram of an MACsec Key Agreement (MKA) process used to communicate MACsec frames between IEDs over the communication network of FIG. 1, in accordance with an embodiment.

As mentioned above, one technique to control access to an IED is by including a passcode/PIN on the IED referred to herein as an IED password. However, it can be difficult to limit access to the IED by sharing a passcode. As explained below, the MACsec key agreement (MKA) protocol process that is used to communicate MACsec frames may be used to generate secure association keys (SAKs) that are used for access control at the IED FIG. 4 is a timing diagram of a process 260 performed according to MKA protocol between a key server 90, such as the switch 80 or another IED, and an IED 50 to establish a connectivity association (CA) that connects peer-to-peer devices in the communication network 120. Before MKA begins, framework authentication may occur in which each of the devices authenticate the other (arrow 261). For example, secure pre-shared key (PSK) authentication may be used in which each device uses shared keys to ensure that the devices are in fact allowed on the communication network 120. As another example, a master session key (MSK) may be obtained from an extensible authentication protocol (EAP) session. The MSK may then be used to determine a connectivity association key (CAK) for the MKA process. The CAK may then be used to set up and secure a CA to form a communication link between the key server 90 and the IED 50.

Following the framework authentication, the MKA process may begin with the peer-to-peer devices selecting a key server. In the illustrated embodiment, the switch 80 may be selected as the key server (arrow 262). The process may continue with the key server 90 generating a communication SAK that is used to enable communication of MACsec frames between the IED 50 and the key server 90. SAKs may be a random value that is mathematically derived using the CAK as an input. The SAK may be secured by a key encrypting key (KEK) derived from the CAK. Thus, the distribution of the SAK may be secured by the CAK. The key server 90 may then communicate the communication SAK to any of the peer connected devices on the communication network 120 (e.g., IEDs 50, 52, and 54) (arrow 264).

The key server 90 and the IED 50 may then communicate power system data via MACsec frames (arrow 266). The key server 90 and the IED 50 may further continue to send keep alive signals indicating that the CA is still alive (arrow 268). The MKA process may be repeated for each of the application protocols that are used to communicate between the key server 90 and the IED 50.

The communication SAK may be assigned to a communication session between the key server 90 and the IED 50. These communication SAKs may expire after a certain number of frames/time and the key server 90 may generate another one using the same CAK. Further, the communication frames may indicate which SAK is associated with the frame to allow the receiving device to decrypt the frame.

Alternatively and/or additionally, the key server 90 and the IED 50 may use the MKA process and the CAK of the communication link to generate a set of access control SAKs and to distribute the access control SAKs to the IED 50 (arrow 270). The access control SAKs may be used by the IED 50 to authenticate operators at the IED 50. The CAK may be used to generate a set of tens, hundreds, thousands, or more access control SAKs. By using the MKA process to send the set of access control SAKs, the SAKs are ensured to be securely communicated to the IED 50 such that the key server 90 and the IED 50 have the access control SAKs.

Figure 5:
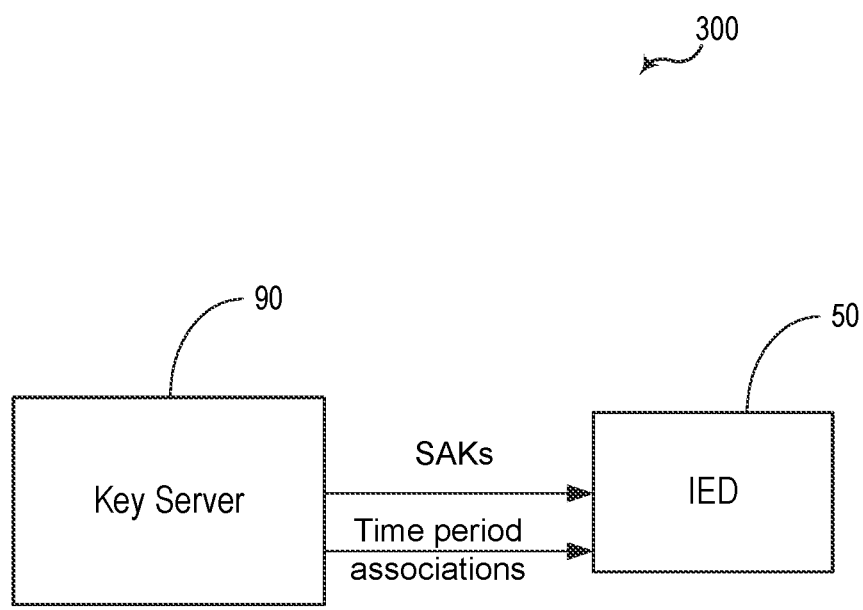
FIG. 5 is a block diagram of an access control system in which access is controlled to an IED via a key server of the electric power delivery system of FIG. 1, in accordance with an embodiment.

FIG. 5 is a block diagram of an access control system 300 that includes a key server 90 that communicates a set of access control SAKs to the IED 50 upon establishing the MACsec communication link using a CAK. As mentioned above, any suitable number of SAKs may be generated using the CAK.

Each access control SAK in the set may be associated with access control restrictions that indicates what access a particular access control SAK allows an operator to have at the IED 50. That is, different access control SAK may be associated with a particular time period, a particular operator, a group of operators, or a combination thereof. For example, a first access control SAK may be associated with a time period of 10:00 am-2:00 pm on Feb. 15, 2021, a second access control SAK may be associated with 2:00-6:00 pm on Feb. 15, 2021, a third access control SAK may be associated with 10:00-2:00 pm on February 16, and so on. Further, the first, second, and third access control SAK may authorize person A to obtain monitoring data while not authorizing control operations, and a fourth, fifth, and sixth access control SAK may authorize person B to perform control operations (e.g., tripping circuit breakers) on the circuit breaker. While these are used as examples, any suitable combination of access control restrictions (e.g., restrictions by time, person, and/or privileges) may be associated with each SAK in the set of access control SAKs.

The key server 90 may communicate a table that maps each access control SAK to the associated access control restrictions to the IED 50. By communicating the access control SAKs via the MKA process (e.g., process 260 of FIG. 4), access to the SAKs may be limited to the key server 90, the IED 50, and any devices and/or operators authorized by the key server 90.

Figure 6:
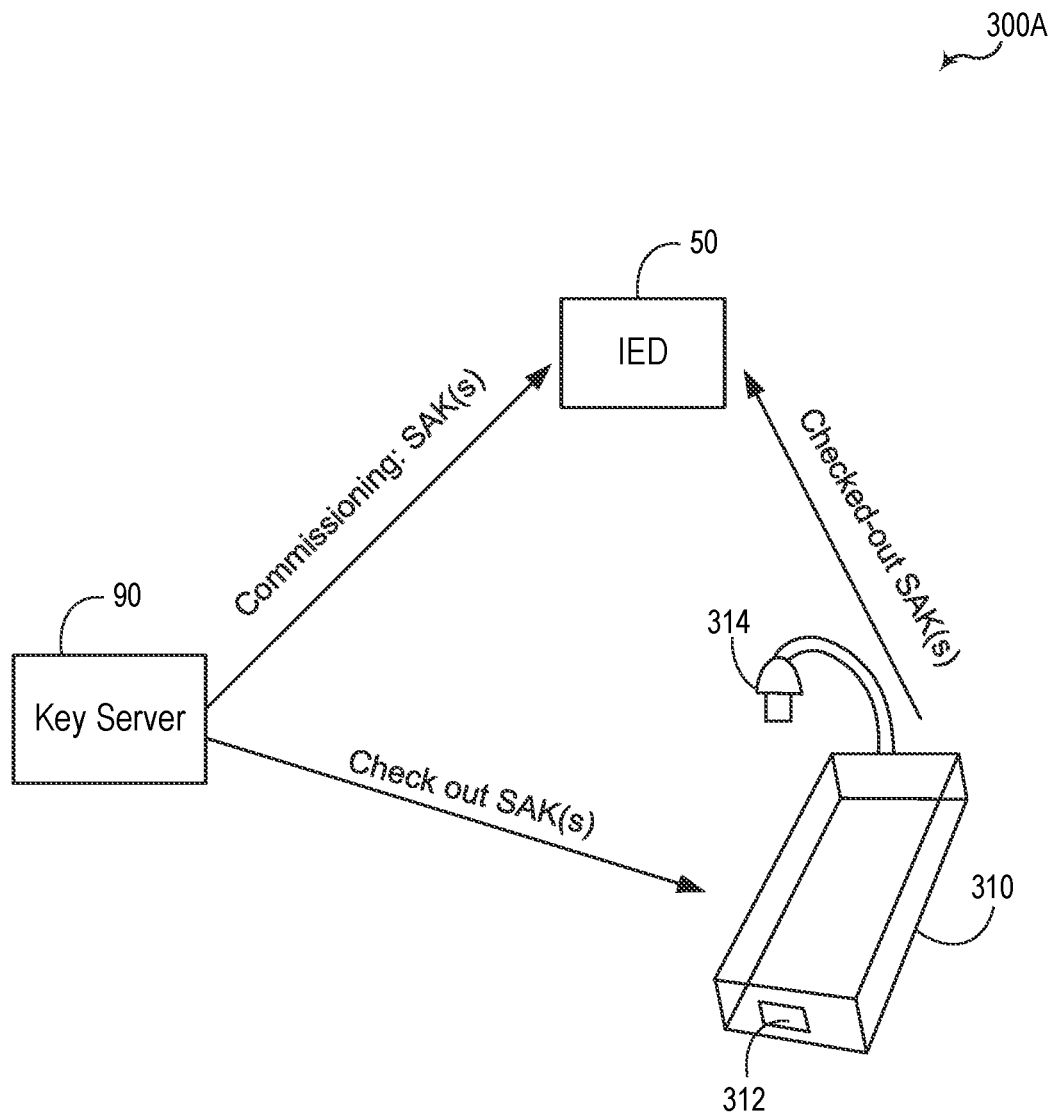
FIG. 6 is a block diagram of a technique that may be used by the access control system of FIG. 5, in accordance with an embodiment.

FIG. 6 is a block diagram that illustrates one technique in which the access control system 300 of FIG. 5 may be used. The access control system 300A includes the IED 50, the key server 90, and an access control device 310. Similar to the process described above, during commissioning of the IED 50 onto the power system, the key server 90 may generate a set of access control SAKs to selectively control access for operators to the IED 50. The key server 90 may receive an input from an administrator requesting to check out one or more access control SAKs. For example, the key server 90 may receive the input via a gateway or at a terminal of the key server 90. The key server 90 may load the checked-out access control SAKs onto the access control device 310. As illustrated, the access control device may be embodied as a Universal Serial Bus (USB)-to-Ethernet adapter having a USB connector 314 and an ethernet port 312. While the illustrated embodiment uses a USB-to-Ethernet adapter as the access control device 310, any suitable hardware device, such as a smart card, a cryptographic card, a device that uses hardware security tokens, or a device with other credential stores, may be used. In some embodiments, a laptop, tablet, smartphone, or other device may include configuration software that allows the laptop to operate as the access control device 310 itself and used to check out SAKs and be connected to the IED to load the checked-out SAKs onto the IED for access without a separate access control device. The administrator may give the access control device 310 to a local operator that is tasked with inspecting a set of IEDs Note that, while the access control SAKs loaded onto the access control device 310 are referred to as "checked-out", some embodiments may allow check out of SAKs to more than one operator while other embodiments may limit the checked-out SAKs to one operator at a time.

Figure 7:
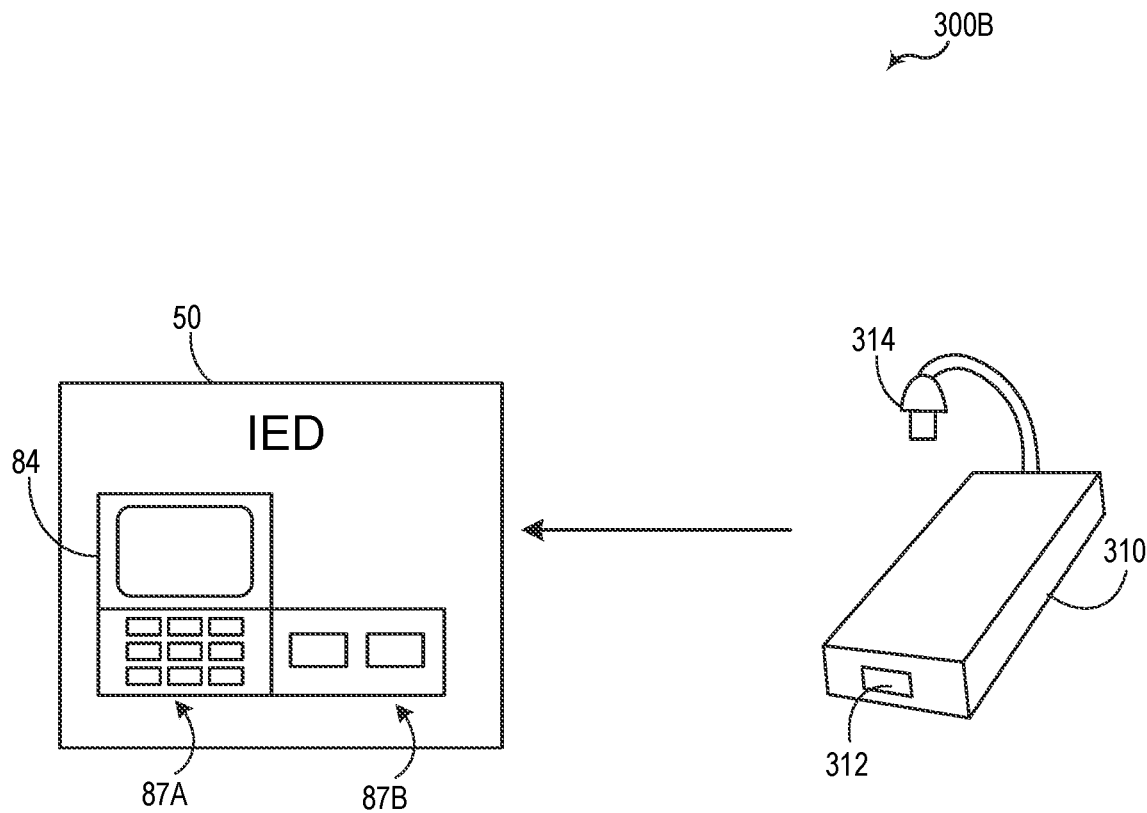
FIG. 7 is a block diagram another technique that may be used by the access control system of FIG. 5, in accordance with an embodiment.

FIG. 7 is a block diagram of a technique in which an operator may be authenticated at the IED 50 in the access control system 300 of FIG. 5. As shown in the access control system 300B, the local operator may connect the USB-to-Ethernet adapter to an electronic device (e.g., via the USB 314) and enter a PIN/passcode on the electronic device, such as a laptop, tablet, or smartphone, to authenticate the local operator as a first form of authentication. In some embodiments, the IED may confirm that the user has entered an operator password. Alternatively, the hardware of the access control device may may confirm that the user has entered an operator password. As illustrated, the IED 50 may include buttons 87A, ethernet ports 87B and other controls/ports as input structures. The IED 50 may include a display 84, such as a touchscreen display. The local operator may connect an ethernet cable from ethernet port 312 of the access control device 310 to the ethernet port 87B of the IED 50 to load the checked-out SAKs stored on the USB-to-Ethernet adapter onto the IED 50 to allow the IED 50 to compare the checked-out SAKs with the stored access control SAKs. The IED 50 may determine that the USB-to-Ethernet adapter has a valid SAK among the checked-out SAKs as a second form of authentication. For example, the IED 50 may determine the currently valid SAKs from the set of access control SAKs based on the associated times of the SAKs and the current time at which the IED 50 is being accessed. The IED 50 may compare the currently valid SAKs to the checked-out SAKs of the USB-to-Ethernet adapter and determine that one of the checked-out SAKs matches.

When a checked-out SAK on the USB-to-Ethernet adapter matches one or more of the stored access control SAKs of the IED 50, then the IED 50 may allow the operator to access monitoring operations, control operations, protection operations, or a combination thereof. In some embodiments, access may be restricted according to access control restrictions associated with the matching SAK. Further, by having an additional factor of authentication (i.e., a matching SAK and a PIN/passcode), the IED 50 may be better protected than systems that implement fewer factors of authentication.

In some embodiments, the IED 50 may disable a login prompt on the IED 50 upon authenticating the operator. That is, some IEDs may use a login prompt to allow an operator to enter the IED password stored in memory of the IED 50. In lieu of the IED password, an operator may be given access to the IED 50 upon providing the multi-factor authentication without an IED-specific password. If the checked-out access control SAKs do not match the currently valid access control SAKs stored on the IED 50, then the IED 50 may send a notification (e.g., via the gateway) indicating a failed login attempt.

In certain embodiments, the IED 50 may maintain a security log of access and/or operations performed on an IED 50. For instance, the IED 50 may record actions (e.g., accessing power system data, software updates, configuration changes, protection operations, etc.) and associate the recorded actions with a validated access control SAK used to grant access. In some implementations, the security log may be used to confirm that a particular operator associated with a particular access control SAK performed or did not perform certain operations on the IED 50. As another example, the IED 50 may log invalid access attempts in a security log of the IED 50 to allow administrators to monitor access attempts using SAKs.

Figure 8:
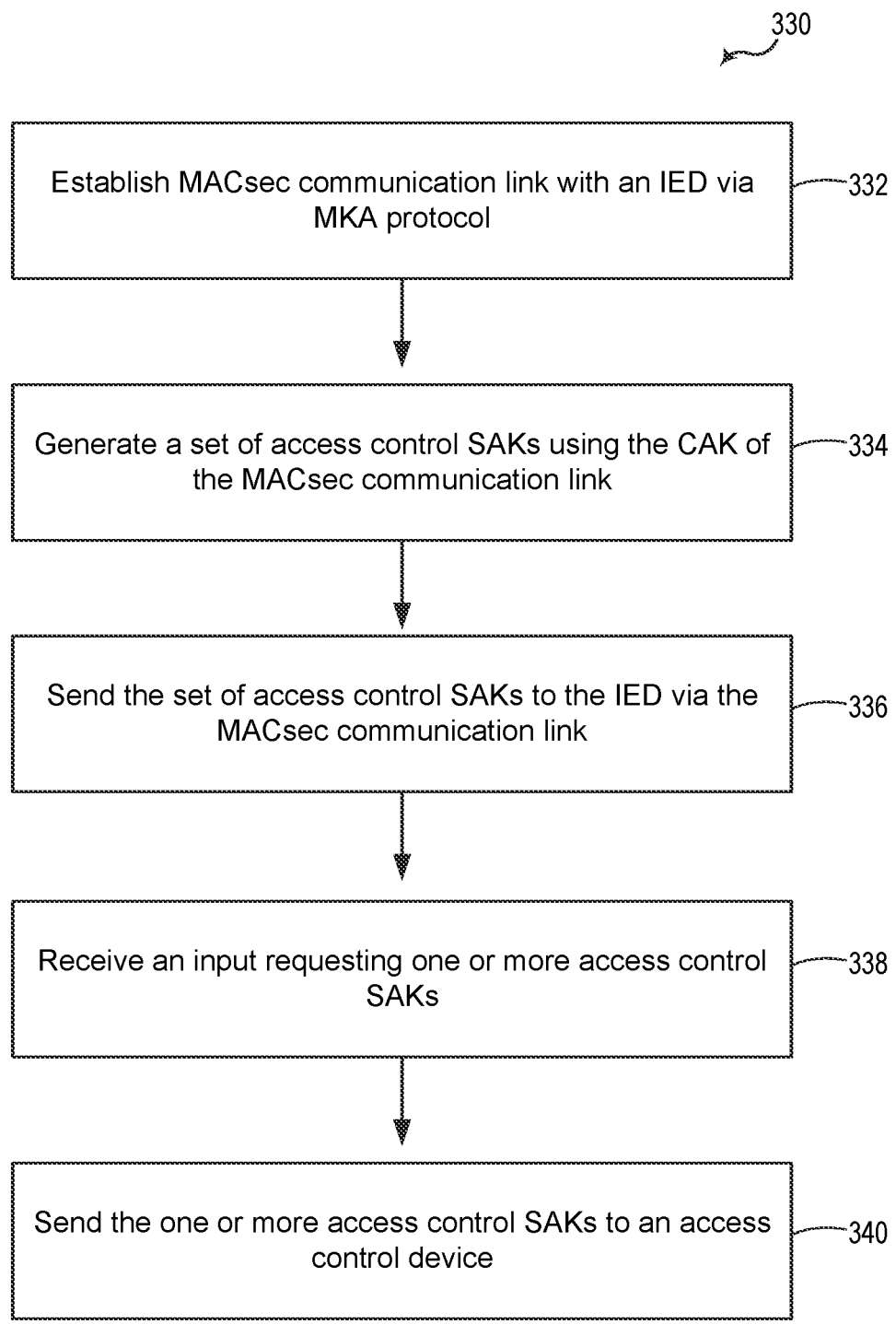
FIG. 8 is a flow diagram a process that performed by the key server, the IED, and the access control device according to the techniques of FIGS. 5-7, in accordance with an embodiment.

FIG. 8 is a flow diagram of the process 330 performed by the key server 90, the IED 50, and the access control device 310 as described with respect to FIGS. 4-7. The key server 90 and the IED 50 may establish a MACsec communication link via the MKA protocol (block 332). The MACsec communication link (e.g., CA) may be, for example, a link that is used to communicate power system data or a separate device management communication link that is used to communicate MACsec device management messages. The key server 90 may generate a set of access control SAKs using the CAK of the MACsec communication link (block 334). In some embodiments, the key server 90 may also derive SAKs from a random number generator. The key server 90 may then send the set of access control SAKs to the IED secured via the MACsec communication link (block 336). Communication of the access control SAKs may be performed during commissioning time. For example, during an initial installation and/or testing of the IED 50 onto the power system and/or the communication network, the key server 90 may establish the MACsec communication link and communicate the SAKs to the IED.

The key server 90 may then receive an input requesting one or more access control SAKs (block 338). For example, the administrator may insert a USB-to-Ethernet adapter and input a selection for certain times and days in which an operator may access an IED. The key server 90 may look up in the table a corresponding one or more access control SAKs associated with the selected times/dates and send the checked-out access control SAKs to be loaded onto the USB-to-Ethernet adapter (block 340). Checking out access control SAKs may be performed during operation (e.g., while the IED/power system are on-line and performing monitoring, control, and/or protection operations).

The operator may provide the multiple factors of authentication (e.g., pincode/password, SAK, etc.) at the IED 50 to authenticate the operator. Further, as mentioned above, the IED may disable an IED login prompt and allow access to the configuration, software updating, monitoring, control, and/or protection operations according to the access control SAK. Alternatively, the operator may provide a username and/or password at the access control device instead of on the IED itself The IED 50 may store the access control SAKs and the mapping to associated access control restrictions (e.g., times) into non-volatile memory to ensure that the IED 50 may continue to use the access control SAKs if a power outage occurs. In some embodiments, both the key server 90 and the IED 50 may use clocks that are GPS synchronized to ensure that an SAK distributed by the key server 90 according to a time is also the time on the IED 50. In other embodiments in which the IED 50 does not have access to time synchronization, the IED 50 may maintain a local real time clock (e.g., via clock cycles of the processor 81 or another processor of the IED 50) to determine which access control SAK is associated with the current time. While time is used as a metadata field to filter and match valid keys, other metadata fields such as the MACsec association number, MKA key identifier fields, may be used.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A non-transitory, computer-readable medium comprising instructions configured to be executed by a processor of a key server of a power system, wherein the instructions are configured to cause the processor to:
   establish, over a communication network of a power system, a communication link between an intelligent electronic device (IED) and the key server according to media access control security (MACsec) key agreement (MKA) protocol;
   generate a plurality of access control secure association keys (SAKs)
   send the plurality of access control SAKs to a receiving device via the communication link to allow the receiving device to limit access control of operators to the receiving device
   receive an input requesting to check out one or more access control SAKs; and
   send the one or more checked-out SAKs to an access control device.

2. The non-transitory, computer-readable medium of claim 1, wherein the instructions are configured to cause the processor to:
   generate a table of access control restrictions, wherein each access control restriction is associated with a corresponding access control SAK; and
   send the access control restrictions of each access control SAK to the IED and the association to allow the IED to limit access control of operators at the receiving device according to the access control restrictions.

3. The non-transitory, computer-readable medium of claim 2, wherein each access control SAK is associated with a time period in which the SAK allows an operator to access the IED as the corresponding access control restriction.

4. The non-transitory, computer-readable medium of claim 1, wherein the SAK is generated from a random number generator of the key server.

5. The non-transitory, computer-readable medium of claim 4, wherein the instructions are configured to cause the processor to communicate power system data in MACsec frames that are encrypted using the communication SAK.

6. An intelligent electronic device (IED), comprising:
   a memory; and
   a processor operatively coupled to the memory, wherein the processor is configured to:
   establish, over a communication network of the power system, a communication link between the IED and a key server according to media access control security (MACsec) key agreement (MKA) protocol;
   receive a plurality of access control secure association keys (SAKs) secured by a connectivity association key (CAK) associated with the communication link;
   receive one or more checked-out SAKs indicating a request to access the IED; and
   allow access to the IED based at least in part on the one or more checked-out SAKs matching at least one of the plurality of access control SAKs.

7. The IED of claim 6, wherein the IED is configured to match the one or more checked-out SAKs with at least one of the plurality of access control SAKs as a first form of authentication, and the IED is configured to confirm that the user has entered an operator password as a second form of authentication.

8. The IED of claim 7, wherein the IED is configured to disable an IED login prompt upon confirming two-factor authentication from the first form of authentication and the second form of authentication.

9. The IED of claim 6, wherein the processor is configured to:
   compare a time period associated with the matching access control SAK to a current time; and
   allow access to the IED upon determining that the current time is within the time period of the matching access control SAK.

10. The IED of claim 6, comprising restricting access to at least one of configuration, software updating, monitoring, control, or protection operations according to associated privileges of the access control SAK.

11. The IED of claim 6, comprising a port, wherein the processor is configured to receive the one or more checked-out SAKs from an access control device via the port.

12. The IED of claim 6, wherein the processor is configured to log an invalid login attempt when the one or more checked-out SAKs do not match any of the plurality of access control SAKs.

13. The IED of claim 6, wherein the processor is configured to send a notification when the one or more checked-out SAKs do not match any of the plurality of access control SAKs.

14. The IED of claim 6, wherein the CAK is a shared key between the key server and the IED and used to generate a communication SAK, separate from the plurality of access control SAKs.

15. The IED of claim 14, wherein the processor is configured to obtain power system data from the power system and to communicate the power system data in MACsec frames that are encrypted using the communication SAK.

16. A method, comprising:
 establish, over a communication network of a power system, a communication link between an intelligent electronic device (IED) and a key server according to media access control security (MACsec) key agreement (MKA) protocol;
 receive, at the IED, a plurality of access control secure association keys (SAKs) secured by a connection association key (CAK) associated with the communication link;
 receive, at the IED, one or more checked-out SAKs indicating a request for an operator to access the IED; and
 allow the operator access to the IED based at least in part on the one or more checked-out SAKs matching at least one of the plurality of access control SAKs.

17. The method of claim 16, comprising:
 sending, via the key server, one or more access control SAKs to the IED during commissioning of the IED; and
 sending, via the IED, the one or more checked-out SAKs to an access control device while the IED is on-line on the power system.

18. The method of claim 16, comprising connecting to the key server via a port of the IED.

19. The method of claim 16, comprising disabling an IED password upon confirming that the one or more checked-out SAKs match one of the plurality of access control SAKs and a passcode has been verified.

\* \* \* \* \*